(12) United States Patent
Lee et al.

(10) Patent No.: US 10,286,796 B2
(45) Date of Patent: May 14, 2019

(54) VEHICLE, VEHICLE CHARGING APPARATUS, VEHICLE CHARGING SYSTEM, AND VEHICLE CHARGING METHOD

(71) Applicant: HYUNDAI MOTOR COMPANY, Seoul (KR)

(72) Inventors: Woo Young Lee, Yongin-si (KR); Jin Myeong Yang, Busan (KR); Gyu Yeong Choe, Suwon-si (KR); Jun Ho Kim, Seongnam-si (KR); Inyong Yeo, Bucheon-si (KR); Sihun Yang, Hwaseong-si (KR); JaeEun Cha, Gwangmyeong-si (KR); Dae Woo Lee, Incheon (KR); JinYoung Yang, Hanam-si (KR)

(73) Assignee: Hyundai Motor Company, Seoul (KR)

( * ) Notice: Subject to any disclaimer, the term of this patent is extended or adjusted under 35 U.S.C. 154(b) by 201 days.

(21) Appl. No.: 15/583,212

(22) Filed: May 1, 2017

(65) Prior Publication Data
US 2018/0141444 A1 May 24, 2018

(30) Foreign Application Priority Data

Nov. 23, 2016 (KR) ........................ 10-2016-0156385

(51) Int. Cl.
*H02J 7/02* (2016.01)
*H02J 50/00* (2016.01)
*B60L 11/18* (2006.01)

(52) U.S. Cl.
CPC ......... *B60L 11/182* (2013.01); *B60L 11/1851* (2013.01); *B60L 2230/10* (2013.01); *Y02T 10/7005* (2013.01); *Y02T 10/705* (2013.01); *Y02T 10/7088* (2013.01); *Y02T 90/12* (2013.01); *Y02T 90/122* (2013.01); *Y02T 90/14* (2013.01)

(58) Field of Classification Search
CPC ............................... H02J 7/025; B60L 11/182
USPC .......................................................... 320/108
See application file for complete search history.

(56) References Cited

U.S. PATENT DOCUMENTS

2017/0104371 A1\* 4/2017 Wakabayashi .......... H02J 50/10
2017/0207535 A1\* 7/2017 Tsukuda ................... H01Q 7/00

\* cited by examiner

*Primary Examiner* — Edward Tso
*Assistant Examiner* — Ahmed H Omar
(74) *Attorney, Agent, or Firm* — Brinks Gilson & Lione

(57) ABSTRACT

The present disclosure provides a vehicle, a vehicle charging apparatus, vehicle charging system, and a vehicle charging method. The vehicle charging apparatus may include: a first coil; a second coil having one end selectively connected to one end of the first coil, and the other end selectively connected to the other end of the first coil; a third coil having one end selectively connected to one end of the first coil, and the other end selectively connected to the other end of the second coil; and a fourth coil having one end selectively connected to one end of the second coil, and the other end selectively connected to the other end of the first coil, where the fourth coil intersects the third coil.

23 Claims, 15 Drawing Sheets

VEHICLE, VEHICLE CHARGING APPARATUS, VEHICLE CHARGING SYSTEM, AND VEHICLE CHARGING METHOD

CROSS-REFERENCE TO RELATED APPLICATION

The present application claims priority to and the benefit of Korean Patent Application No. 10-2016-0156385, filed on Nov. 23, 2016, which is incorporated herein by reference in its entirety.

FIELD

The present disclosure relate to a vehicle, a vehicle charging apparatus, vehicle charging system, and a vehicle charging method.

BACKGROUND

The statements in this section merely provide background information related to the present disclosure and may not constitute prior art.

A vehicle is an apparatus that can travel on roads or tracks. Examples of the vehicle include a three-wheeled vehicle, a four-wheeled vehicle, a two-wheeled vehicle such as a motorcycle, a motor bicycle, construction equipment, a bicycle, and a train running on a track.

The vehicle moves on roads or tracks by rotating one or more wheels installed in the vehicle body. The vehicle can gain power for rotating the wheels using various methods. For example, the vehicle can gain thermal energy by burning fossil fuel, such as gasoline or diesel, and convert the thermal energy into mechanical energy, thereby gaining power for rotating the wheels. Alternatively, the vehicle can convert electrical energy charged in a battery installed therein into mechanical energy, thereby gaining power for rotating the wheels. The vehicle of gaining power using electrical energy is called an electric vehicle.

The electric vehicle can be classified into an Electric Vehicle (EV) using only electrical energy to gain power, a Hybrid Electric Vehicle (HEV) of gaining power using at least one of electrical energy and energy acquired by burning fossil fuel, and a Plug-in Hybrid Electric Vehicle (PHEV) using both combustion energy and electrical energy, where the PHEV can receive electrical energy from the outside to store the electrical energy.

SUMMARY

It is an aspect of the present disclosure to provide a vehicle capable of being wirelessly charged appropriately regardless of the structure of a coil in which signals are induced by a magnetic field, a vehicle charging apparatus, vehicle charging system, and a vehicle charging method.

Additional aspects of the disclosure will be set forth in part in the description which follows and, in part, will be obvious from the description, or may be learned by practice of the disclosure.

In accordance with one aspect of the present disclosure, a vehicle charging apparatus may include a first coil, a second coil having one end selectively connected to one end of the first coil, and the other end selectively connected to the other end of the first coil, a third coil having one end selectively connected to one end of the first coil, and the other end selectively connected to the other end of the second coil and a fourth coil having one end selectively connected to one end of the second coil, and the other end selectively connected to the other end of the first coil, where the fourth coil configured to intersect the third coil.

The vehicle charging apparatus may further include a first switch configured to electrically connect one end of the first coil to one end of the second coil, or to electrically connect one end of the first coil to one end of the third coil.

When one end of the first coil is electrically connected to one end of the third coil, the first switch electrically may connect one end of the second coil to one end of the fourth coil.

The vehicle charging apparatus may further include a second switch configured to electrically connect the other end of the first coil to the other end of the second coil, or to electrically connect the other end of the first coil to the outer end of the fourth coil.

When the other end of the first coil is electrically connected to the other end of the fourth coil, the second switch electrically may connect the other end of the second coil to the other end of the third coil.

The vehicle charging apparatus may further include a controller configured to transfer a control signal to the first switch and the second switch.

The controller may control operations of the first switch and the second switch based on a user's manipulation or a pre-defined setting.

A coil structure of a signal inducer installed in the vehicle may be determined by the pre-determined setting, and the coil structure of the signal inducer may be charged based on current flowing through the first coil, the second coil, the third coil, or the fourth coil.

The controller may control the first switch to electrically connect one end of the first coil to one end of the second coil, and control the second switch to electrically connect the other end of the first coil to the other end of the second coil.

The vehicle charging apparatus may further include a communication module configured to communicate with a vehicle.

The communication module may receive information about a voltage of an electrical signal induced by the signal inducer of the vehicle, and the controller may decide operations of the first switch and the second switch based on the information about the voltage.

When the voltage of the electrical signal is greater than a reference value, the controller may decide that the operations of the first switch and the second switch need to be maintained.

When the voltage of the electrical signal is smaller than or equal to the reference value, the controller may control the first switch to electrically connect one end of the first coil to one end of the third coil, and to electrically connect one end of the second coil to one end of the fourth coil, and may control the second switch to electrically connect the other end of the first coil to the other end of the fourth coil, and to electrically connect the other end of the second coil to the other end of the third coil.

Vehicle charging system may include a vehicle charging apparatus configured to generate a magnetic field corresponding to an applied electrical signal and a signal inducer included in a vehicle configured to induce current based on the magnetic field, where the vehicle charging apparatus may include, a first coil, a second coil having one end selectively connected to one end of the first coil, and the other end selectively connected to the other end of the first coil, a third coil having one end selectively connected to one end of the first coil, and the other end selectively connected to the other end of the second coil and a fourth coil having one end selectively connected to one end of the second coil, and the other end selectively connected to the other end of the first coil.

The vehicle charging apparatus may communicate with the vehicle, and the vehicle may transfer at least one of information about a structure of the signal inducer and information about a voltage of an electrical signal induced by the signal inducer to the vehicle charging apparatus.

One end of the first coil may be connected to one end of the second coil, or to one end of the third coil, depending on the structure of the signal inducer.

The signal inducer may include a coil of a circular structure or an "8"-shaped structure.

A vehicle may include a first coil installed in at least one location of the vehicle, a second coil having one end selectively connected to one end of the first coil, and the other end selectively connected to the other end of the first coil, a third coil having one end selectively connected to one end of the first coil, and the other end selectively connected to the other end of the second coil and a fourth coil having one end selectively connected to one end of the second coil, and the other end selectively connected to the other end of the first coil.

A vehicle may include a signal inducer through which induced current flows by a magnetic field generated by a charging coil of a vehicle charging apparatus, a measuring device configured to measure a magnitude of induced current or an induced electromotive force of the signal inducer, a controller configured to compare the magnitude of the induced current or the induced electromotive force with a pre-defined value, and to generate a coil-structure changing command, when the magnitude of the induced current or the induced electromotive force is smaller than the pre-defined value and a communication module configured to transmit the coil-structure changing command to the vehicle charging apparatus.

A vehicle charging method may include determining a structure of a signal inducer of a vehicle, when the structure of the signal inducer is a first structure, connecting both ends of a first coil provided in a vehicle charging apparatus to both ends of a second coil, and when the structure of the signal inducer is a second structure, connecting one end of the first coil to one end of a third coil, connecting the other end of the first coil to the other end of a fourth coil, connecting one end of the second coil to one end of the fourth coil, and connecting the other end of the second coil to the other end of the third coil, wherein the third coil intersects the fourth coil.

The determining of the structure of the signal inducer of the vehicle may include at least: receiving information about a structure of the signal inducer of the vehicle from a user, or determining the structure of the signal inducer of the vehicle based on the received information and determining the structure of the signal inducer of the vehicle based on a pre-defined setting.

A vehicle charging method may include: with a first switch and a second switch of a magnetic field generator of a vehicle charging apparatus, operating to set the magnetic field generator to a first structure or a second structure; receiving information about a voltage of a signal inducer installed in a vehicle from the vehicle, maintaining, with the magnetic field generator, the first structure or the second structure when the voltage of the signal inducer is greater than a reference value; and with the first switch and the second switch, when the voltage of the signal inducer is less than or equal to the reference value, operating to change the structure of the magnetic field generator from the first structure to the second structure, or to change the structure of the magnetic field generator from the second structure to the first structure.

The first structure may be set if the first switch and the second switch provided in the vehicle charging apparatus connect both ends of the first coil to both ends of the second coil, respectively, and the second structure may be set when the first switch and the second switch connect one end of the first coil to one end of the third coil, connect the other end of the first coil to the other end of the fourth coil, connect one end of the second coil to one end of the fourth coil, and connect the other end of the second coil to the other end of the third coil.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
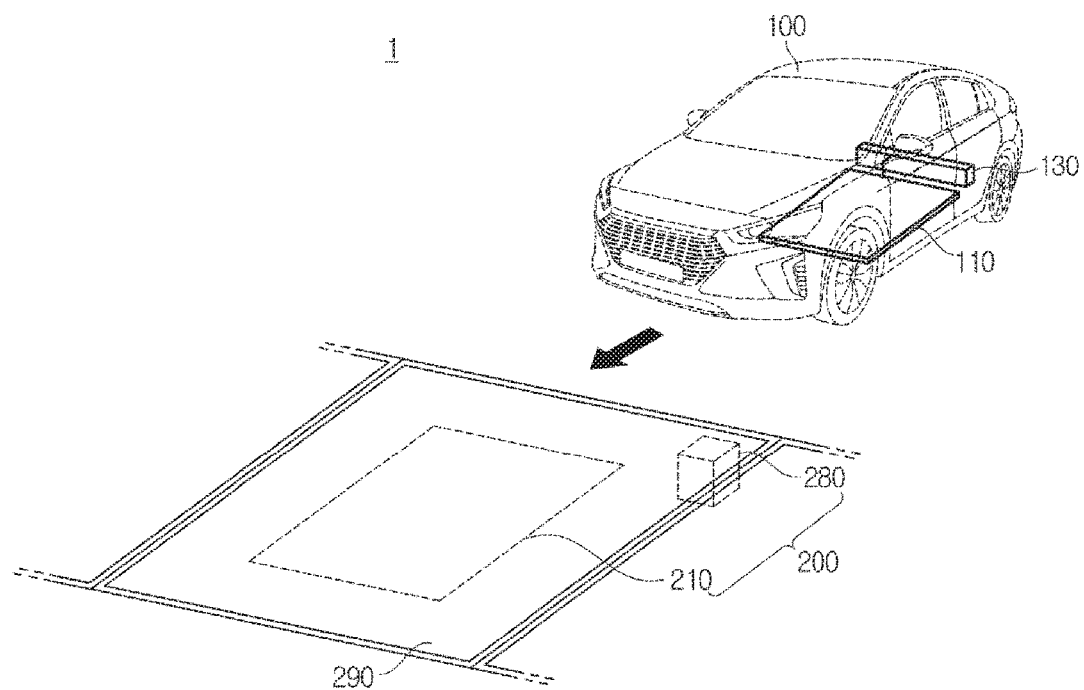
FIG. 1 is a view describing a vehicle charging system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
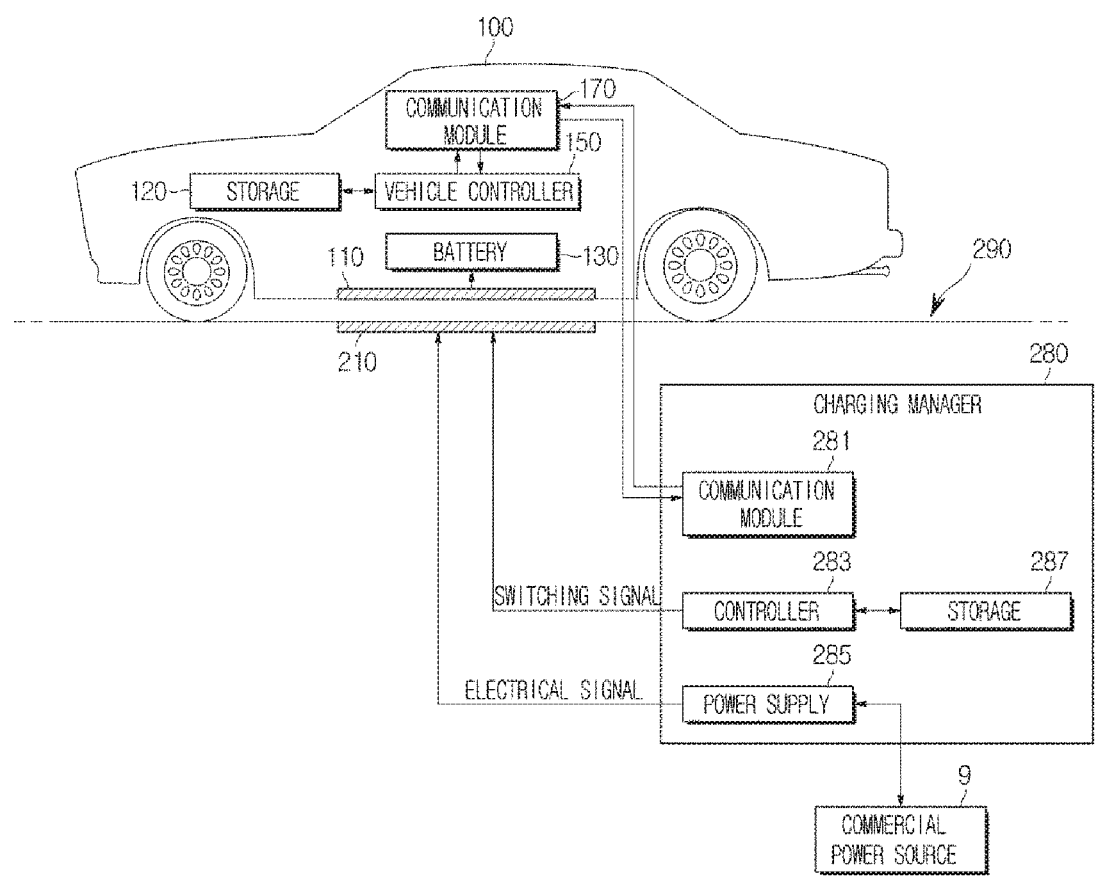
FIG. 2 is a block diagram of the vehicle charging system.

FIG. 1 is a view for describing a vehicle charging system, and FIG. 2 is a block diagram of the vehicle charging system.

As shown in FIGS. 1 and 2, vehicle charging system 1 may include a vehicle 100 including a signal inducer 110 and a battery 130, and a vehicle charging apparatus 200 to charge the vehicle 100 by causing induced current to flow through the signal inducer 110.

The vehicle 100 may be configured to travel on roads or rails. The vehicle 100 may be a two-wheeled vehicle, a three-wheeled vehicle, a four-wheeled vehicle, construction equipment, or a train. The four-wheeled vehicle may include a large vehicle, such as a truck or a bus, as well as a normal vehicle such as sedan.

The vehicle 100 may move to a charging area 290, and stop or be parked in the charge area 290. If the vehicle 100 is located in the charging area 290, the battery 130 included in the vehicle 100 may be charged by the vehicle charging apparatus 200 and the signal inducer 110. The charging area 290 may include an area in a parking lot or a charging station for vehicle. Also, the charging area 290 may be any other place provided to charge the vehicle 100.

In some forms of the present disclosure, the vehicle 100 may include the signal inducer 110 and the battery 130, as described above.

The signal inducer 110 may be disposed at a predetermined location in the vehicle 100. For example, the signal inducer 110 may be disposed in the lower portion of the vehicle 100 so that the signal inducer 110 can be located adjacent to a magnetic field generator 210 of the vehicle charging apparatus 200 when the vehicle 100 stops in the charging area 290.

In some forms of the present disclosure, the signal inducer 110 may be implemented using a coil. The coil may have a predetermined structure in shape. For example, the coil may have a circular structure, or a triangular/quadrangular/polygonal structure formed by bending one or more parts of the coil. Hereinafter, for convenience of description, it is defined that the circular structure can include a triangular structure, a quadrangular structure, or a polygonal structure. According to another example, the coil may have an "8"-shaped structure. A coil of the "8"-shaped structure may be implemented by twisting the middle part of a loop coil, or by arranging two circular coils side by side.

Figure 3:
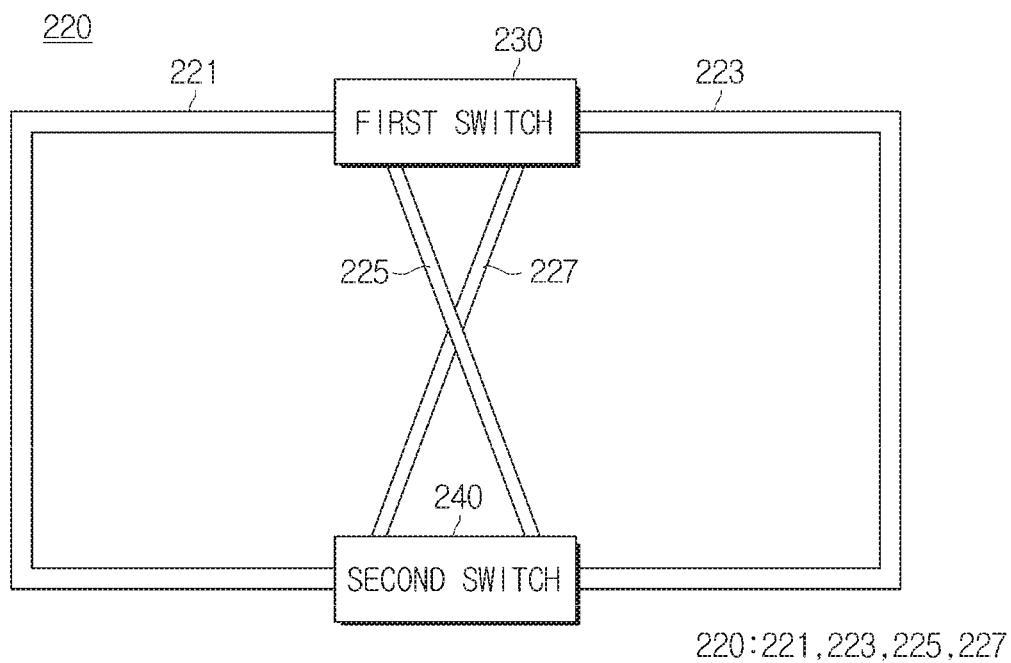
FIG. 3 shows a coil of a vehicle charging apparatus.

Also, the signal inducer 110 may be implemented using a coil of a variable structure, as shown in FIG. 3, which will be described later.

As described above, the coil may be disposed in the lower portion of the vehicle 100, and in this case, the coil may be disposed in the lower portion of the vehicle 100 in such a way to be parallel to the bottom of the charging area 290 or to be nearly parallel to the bottom of the charging area 290.

If the signal inducer 110 is exposed to a magnetic field formed by the magnetic field generator 210 of the vehicle charging apparatus 200, current corresponding to a change of the magnetic field may flow through signal inducer 110 according to electromagnetic induction. The current flowing through the signal inducer 110 may be transferred to the battery 130 via a leading wire or a circuit.

The battery 130 may be configured to accumulate electrical energy, and to supply required electrical energy to the individual components of the vehicle 100.

For example, the battery 130 may supply electrical energy to a motor (not shown) of the vehicle 100, and the motor may convert the received electrical energy into mechanical energy, and then transfer the mechanical energy to the wheels of the vehicle 100 through a transmission, etc. Accordingly, the vehicle 100 may acquire power required for driving. Also, the battery 130 may supply electrical energy to various kinds of electronic devices installed in the vehicle 100, for example, a display for vehicle, a dashboard, etc. In addition, the battery 130 may supply required electrical energy to various components included in the vehicle 100.

The battery 130 may be implemented as one of various kinds of batteries, such as a lithium-based battery (for example, a lithium-titanium battery, a lithium-polymer battery, a lithium-ion battery, or a lithium-air battery), a lead battery, a nickel-cadmium battery, and a natrium-nickel chloride battery.

The current induced by the signal inducer 110 may be applied to the battery 130 so as to charge the battery 130.

In some forms of the present disclosure, the vehicle 100 may further include at least one of a storage 120, a vehicle controller 150, and a communication module 170. The storage 120, the vehicle controller 150, and the communication module 170 may communicate with each other using a leading wire, a circuit, or a wireless communication apparatus. Some of the storage 120, the vehicle controller 150, and the communication module 170 may be omitted according to a designer's selection.

The vehicle controller 150 may be configured to control various operations of the vehicle 100. For example, the vehicle controller 150 may control operations of the communication module 170 or the storage 120, or may control operations of a display, a dashboard, and a broadcast receiver, installed in the vehicle 100. Also, the vehicle controller 150 may adjust the magnitude of current that is applied to the stator of the motor to thereby control the operation of the motor in various ways.

In some forms of the present disclosure, the vehicle controller 150 may determine whether induced current or an induced electromotive force induced by the signal inducer 110 is appropriate. If the signal inducer 110 is implemented using a coil of a variable structure, and induced current or an induced electromotive force is inappropriate, the vehicle controller 150 may transmit a control signal to the signal inducer 110 to enable the signal inducer 110 to change the structure of the coil. If the magnetic field generator 210 of the vehicle charging apparatus 200 is variable, the vehicle controller 150 may generate a coil-structure changing command, and transmit the coil-structure changing command to a charging manager 280.

Also, in some forms of the present disclosure, if the signal inducer 110 is implemented using a coil of a variable structure, the vehicle controller 150 may receive information about the coil structure of a charging coil 220 transmitted from the charging manager 280, and transmit a control signal to the signal inducer 110 based on the received information to control the signal inducer 110 to change the structure of the coil.

The vehicle controller 150 may be implemented by adopting a processor configured with at least one semiconductor chip and the related components. The processor may include a Central Processing Unit (CPU) and a Micro Control Unit (MCU). Also, various kinds of processors separately provided to perform various arithmetic operations and processing may be adopted as the vehicle controller 150.

The storage 120 may be configured to temporarily or non-temporarily store various data required for operations of the vehicle 100. For example, the storage 120 may store a reference value that is used to be compared with induced current and an induced electromotive force of the signal inducer 110. The storage 120 may transfer the stored data to the vehicle controller 150, and the vehicle controller 150 may generate various control signals related to the vehicle 100 based on the received data.

The storage 120 may be implemented using various kinds of storages, such as a semiconductor storage, a magnetic drum storage, and a magnetic disk storage.

The storage 120 may include at least one of main memory and auxiliary memory. The main memory may be implemented by adopting Random Access Memory (RAM), such as Static Random Access Memory (SRAM) or Dynamic Random Access Memory (DRAM), and the auxiliary memory may be implemented using various storage media that can store data, such as a Solid State Drive (SSD), a Hard Disc Drive (HDD), a Compact Disc (CD), a laser disc, a magnetic tape, a magneto-optical disc, and/or a floppy disc.

The communication module 170 may be configured to communicate with a communication apparatus provided outside the vehicle 100, for example, a communication module 281 of the charging manager 280. The communication module 170 may be implemented using a communication chip and an antenna.

For example, the communication module 170 may convert a control signal generated by the vehicle controller 150 into a communication format, and emit the converted signal to the outside of the vehicle 100 to transmit the signal to the communication module 281 of the charging manager 280. Also, the communication module 170 may receive a signal transmitted from the charging manager 280. The signal received by the communication module 170 may be transferred to at least one of the vehicle controller 150 and the signal inducer 110, according to some forms of the present disclosure.

The communication module 170 may communicate with the communication module 281 of the charging manager 280 using predetermined wireless communication technology. Wireless communication technology may be implemented using at least one of short-range communication technology and mobile communication technology. The short-range communication technology may include Wireless-Fidelity (Wi-Fi), Wi-Fi Direct, Zigbee, Bluetooth, Bluetooth Low Energy, or Near Field Communication (NFC). Also, the mobile communication technology may adopt various mobile communication standards, such as 3rd Generation Partnership Project (3GPP), 3rd Generation Partnership Project 2 (3GPP2), and Worldwide Interoperability for Micro-wave Access (WiMax)-based technology.

In some forms of the present disclosure, the vehicle 100 may further include a measuring device (not shown) to measure induced current or an induced electromotive force (that is, an induced voltage) induced by the signal inducer 110, or a charged voltage of the battery 130. The measuring device may be implemented using a general current meter or a general voltage meter. The measuring device may be directly or indirectly connected to at least one of the signal inducer 110, a circuit or leading wire connecting the signal inducer 110 to the battery 130, and the battery 130, through at least one circuit or leading wire.

In some forms of the present disclosure, an induced electromotive force, a charged voltage of the battery 130, or the magnitude of induced current, measured by the measuring device, may be transferred to the vehicle controller 150. The vehicle controller 150 may acquire the reference value from the storage 120, in response to the reception of the induced electromotive force, the charged voltage of the battery 130, or the magnitude of induced current, and compare the induced electromotive force, the charged voltage of the battery 130, or the magnitude of induced current to the reference value.

If the induced electromotive force, the charged voltage of the battery 130, or the magnitude of induced current is smaller than the reference value, the vehicle controller 150 may determine that charging is not appropriately performed, generate a coil-structure changing command, and transfer the coil-structure changing command to the communication module 170. Then, the communication module 170 may convert the coil-structure changing command into a communication format, and transmit the converted command to the communication module 281 of the charging manager 280. If the induced electromotive force, the charged voltage of the battery 130, or the magnitude of induced current is greater than the reference value, the vehicle controller 150 may determine that charging is appropriately performed. The result of the determination may be transferred to the controller 283 of the charging manager 280, via the communication module 170 of the vehicle 100 and the communication module 281 of the charging manager 280, as necessary.

The reference value that is compared with the induced electromotive force, the charged voltage of the battery 130, or the magnitude of induced current may be arbitrarily defined according to the designer's selection. The reference value may be defined as an arbitrary value according to the shape of the coil of the signal inducer 110, the material of the coil, the cross-sectional area of the coil, the size of the coil, the type of the battery 130, etc.

In another form of the present disclosure, the induced electromotive force, the charged voltage of the battery 130, or the magnitude of induced current, measured by the measuring device may be transferred to the communication module 170, and the communication module 170 may transfer the induced electromotive force, the charged voltage of the battery 130, or the magnitude of induced current to the charging manager 280. The controller 283 of the charging manager 280 may generate a control signal for at least one of a first switch 230 and a second switch 240, based on the induced electromotive force, the charged voltage of the battery 130, or the magnitude of induced current.

In some forms of the present disclosure, the vehicle charging apparatus 200 may include the magnetic field generator 210 and the charging manager 280, as shown in FIGS. 1 and 2.

The magnetic field generator 210 may generate a magnetic field, and cause current corresponding to the magnetic field to flow through the signal inducer 110 of the vehicle 100. The magnetic field generated by the magnetic field generator 210 may change according to current supplied from a power supply 285.

In some forms of the present disclosure, the magnetic field generator 210 may be implemented using a charging coil (220 of FIG. 3).

If the signal inducer 110 is implemented using a coil of a circular structure or an "8"-shaped structure, and the magnetic field generator 210 is implemented using the charging coil 220 of a variable structure, the coil of the circular structure or the "8"-shaped structure of the signal inducer 110 may have a relatively smaller size than the charging coil 220 of the variable structure of the magnetic field generator 210. That is, the entire width and/or length of the coil of the circular structure or the "8"-shaped structure of the signal inducer 110 may be relatively smaller than that of the charging coil 220 of the variable structure of the magnetic field generator 210.

The magnetic field generator 210 may be installed in the charging area 290 in such a way to be parallel to the bottom of the charging area 290 or to be nearly parallel to the bottom of the charging area 290. In some forms of the present disclosure, the magnetic field generator 210 may be embedded in the charging area 290. Also, in other forms of the present disclosure, the magnetic field generator 210 may be installed on the bottom of the charging area 290. If the magnetic field generator 210 is installed on the bottom of the charging area 290, the magnetic field generator 210 may be accommodated in a separate housing (not shown) fabricated with a material such as metal or synthetic resin, and then installed in the charging area 290, in order to prevent the magnetic field generator 210 from being damaged.

The magnetic field generator 210 will be described in detail, later.

The charging manager 280 may function to control the magnetic field generator 210 to operate or to charge the vehicle 100 appropriately.

The charging manager 280 may be installed in the charging area 290 and/or at a predetermined location around the charging area 290, as shown in FIG. 1.

In some forms of the present disclosure, the charging manager 280 may be embedded in or around the charging area 290. In another form of the present disclosure, the charging manager 280 may be installed on the bottom of the charging area 290 or on the bottom of a predetermined location around the charging area 290 such that the charging manager 280 is exposed to the outside.

In the case in which the charging manager 280 is exposed to the outside, the charging manager 280 may further include a user interface (not shown). The user interface may include an input device (not shown) and/or an output device (not shown). The input device may be configured to receive various information or commands related to charging from a user. For example, the input device may receive information about the structure of the signal inducer 110 of the vehicle 100 from the user. The input device may be implemented using a physical button, a touch screen, a barcode reader, or other various input devices. The output device may output various information related to charging of the vehicle 100, visibly or audibly. The output device may be implemented using one of various display panels, such as a Liquid Crystal Display (LCD), a Light Emitting Diode (LED) display, etc.

As shown in FIG. 2, the charging manager 280 may include the communication module 281, the controller 283, the power supply 285, and a storage 287. Some of the communication module 281, the controller 283, the power supply 285, and the storage 287 may be omitted in some forms of the present disclosure.

The communication module 281 may be configured to communicate with another communication module (for example, the communication module 170 of the vehicle 100) outside the vehicle charging apparatus 200.

For example, the communication module 281 may receive a coil-structure changing command or information about the magnitude of measured induced current and/or a measured induced electromotive force, from the communication module 170 of the vehicle 100. According to another example, the communication module 281 may transmit information about the structure of the magnetic field generator 210 to the communication module 170 of the vehicle 100.

The communication module 281 may perform communication using various wireless communication technology, in the same or similar manner as described above with respect to the communication module 170 of the vehicle 100.

The controller 283 may control overall operations of the charging manager 280.

In some forms of the present disclosure, the controller 283 may control the magnetic field generator 210 to change or maintain the structure. In this case, the controller 283 may maintain or change the structure of the magnetic field generator 210 such that the structure of the magnetic field generator 210 is identical to or corresponds to the structure of the signal inducer 110 installed in the vehicle 100.

In some forms of the present disclosure, the controller 283 may interpret a coil-structure changing command transmitted from the vehicle 100, and generate a control signal for the magnetic field generator 210 to change the structure of the magnetic field generator 210.

Also, in other forms of the present disclosure, the controller 283 may compare the magnitude of induced current, an induced electromotive force, or a charged voltage of the battery 130, transmitted from the vehicle 100, to a pre-defined reference value, and determine whether to maintain or change the structure of the magnetic field generator 210, based on the result of the comparison. If the magnitude of the induced current, the induced electromotive force, or the charged voltage of the battery 130 is greater than the pre-defined reference value, the controller 283 may maintain the current structure of the magnetic field generator 210. In contrast, if the magnitude of the induced current, the induced electromotive force, or the charged voltage of the battery 130 is smaller than the pre-defined reference value, the controller 283 may generate a control signal for changing the structure of the magnetic field generator 210, for example, a control signal corresponding to a control signal related to a first structure or a control signal related to a second structure, and transmit the generated control signal to the magnetic field generator 210, for example, the first switch 230 and the second switch 240 to change the structure of the magnetic field generator 210.

In another form of the present disclosure, if a structure of the signal inducer 110 of the vehicle 100 is input by a user through the input device, the controller 283 may determine the current structure of the magnetic field generator 210, and compare the current structure of the magnetic field generator 210 to the structure of the signal inducer 110, input by the user. If the current structure of the magnetic field generator 210 is identical to or corresponds to the structure of the signal inducer 110, input by the user, the controller 283 may maintain the current structure of the magnetic field generator 210. In contrast, if the current structure of the magnetic field generator 210 is different from the structure of the signal inducer 110, input by the user, the controller 283 may generate a control signal for changing the structure of the magnetic field generator 210, and control the magnetic field generator 210 to change the structure.

In another form of the present disclosure, the controller 283 may read information about a standard for a coil structure for charging a vehicle, or regional information from the storage 287, and if the current structure of the magnetic field generator 210 meets the standard or the current structure of the magnetic field generator 210 is identical to or corresponds to the structure of the signal inducer 110 used in the vehicle 100 belonging to a specific region, the controller 283 may maintain the current structure of the magnetic field generator 210. In contrast, if the current structure of the magnetic field generator 210 does not meet the standard or is different from the structure of the signal inducer 110 used in the vehicle 100 belonging to the specific region, the controller 283 may generate a control signal for changing the structure of the magnetic field generator 210.

If the structure of the coil 220 of the magnetic field generator 210 included in the vehicle charging apparatus 200 is not variable, the controller 283 may control the communication module 281 to transmit information about the structure of the magnetic field generator 210 to the vehicle 100. If the coil structure of the signal inducer 110 of the vehicle 100 is variable, the vehicle controller 150 of the vehicle 100 may maintain or change the structure of the coil of the signal inducer 110 such that the structure of the coil of the signal inducer 110 is identical to or corresponds to the structure of the coil 220 of the magnetic field generator 210.

The controller 283 may be implemented using a processor, like the vehicle controller 150, and the processor may include a CPU or a MCU.

The storage 287 may temporarily or non-temporarily store various data required for operations of the charging manager 280. For example, the storage 287 may store a reference value that is to be compared with the magnitude of induced current or an induced electromotive force. Also, the storage 287 may further store information about a standard for a coil structure for charging a vehicle, or information about a region in which the vehicle charging apparatus 200 is installed.

The storage 287 may be implemented using various kinds of storages, such as a semiconductor storage, a magnetic drum storage, and a magnetic disk storage, as described above.

The power supply 285 may receive power from an external power source, for example, a commercial power source 9, and apply an electrical signal to the magnetic field generator 210. The power supply 285 may perform various operations for appropriately operating the magnetic field generator 210, such as filtering supplied power, raising/lowering an applied voltage, or changing the frequency of alternating current, as necessary.

Hereinafter, the coil 210 of the vehicle charging apparatus 200 will be described in detail. The structure and operation of the coil 210, which will be described below, can be applied to the signal inducer 110 of the vehicle 100, in the same manner or through appropriate modifications.

FIG. 3 shows a coil of a vehicle charging apparatus.

The magnetic field generator 210 may be implemented using the charging coil 220, and the charging coil 220 may include, as shown in FIG. 3, a first coil 221, a second coil 223, a third coil 225, a fourth coil 227, the first switch 230, and the second switch 240.

One end of the first coil 221 may be connected to the first switch 230, and the other end of the first coil 221 may be connected to the second switch 240. The first coil 221 may have various shapes according to the designer's selection. For example, the first coil 221 may be in the shape of a figure bent at least one time, for example, in the shape of a quadrangle whose one side is absent, or in the shape of a semicircle.

One end of the second coil 223 may be connected to the first switch 230, and the other end of the second coil 223 may be connected to the second switch 240. The second coil 223 may have various shapes according to the designer's selection. For example, the second coil 223 may have a shape that is symmetrical to that of the first coil 221. Parts adjacent to both ends of the first coil 221 and the second coil 223 may be a straight line or a nearly straight line, and the parts of the first coil 221 may be parallel to or nearly parallel to those of the second coil 223.

One end of the third coil 225 may be connected to the first switch 230, and the other end of the third coil 225 may be connected to the second switch 240. The third coil 225 may be in the shape of a straight line or a curved line. In some forms of the present disclosure, the third coil 225 may be orthogonal to or nearly orthogonal to the parts adjacent to the ends of the first coil 221 and the second coil 223.

One end of the fourth coil 227 may be connected to the first switch 230, and the other end of the fourth coil 227 may be connected to the second switch 240. The fourth coil 227 may be in the shape of a straight line or a curved line. In some forms of the present disclosure, the fourth coil 227 may be orthogonal to or nearly orthogonal to the parts adjacent to the ends of the first coil 221 and the second coil 223.

The fourth coil 227 may intersect the third coil 225 at at least one point. In this case, in order to inhibit the third coil 225 from being shorted to the fourth coil 227, the third coil 225 may be spaced a predetermined distance apart from the fourth coil 227, or the third coil 225 and the fourth coil 227 may be insulated with a predetermined insulator. In some forms of the present disclosure, a separate insulator may be further disposed between the third coil 225 and the fourth coil 227.

The first switch 230 and the second switch 240 may connect/disconnect the first to fourth coils 221 to 227 to/from each other, as necessary, so that the charging coil 220 can have a plurality of different structures, for example, a first structure or a second structure.

The first switch 230 and the second switch 240 may be symmetrical to each other, according to the designer's selection.

Figure 4:
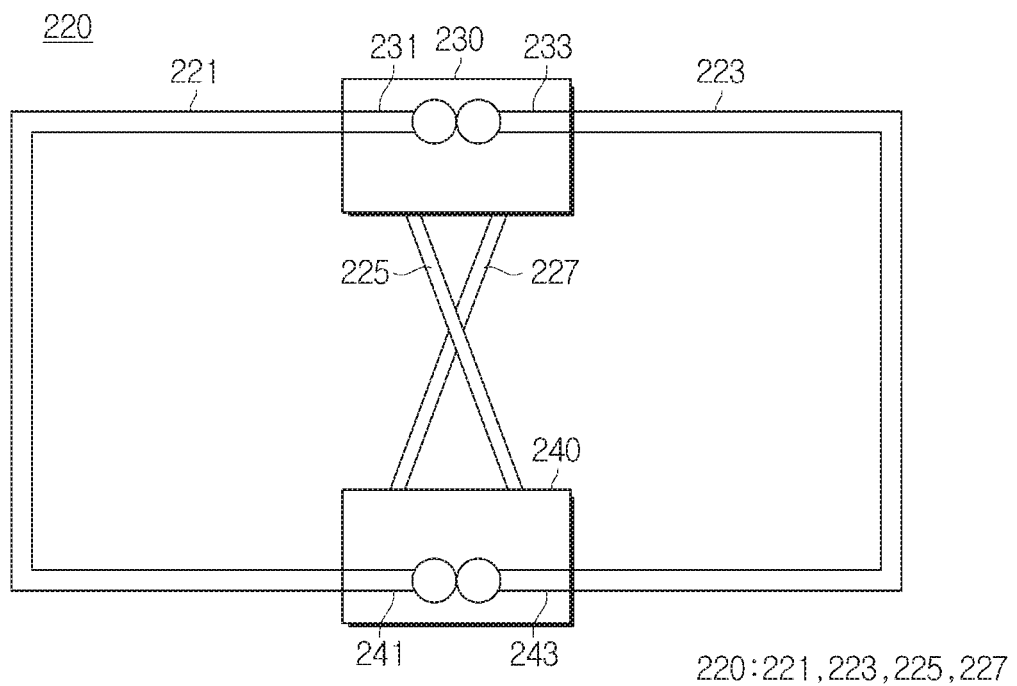
FIG. 4 is a first view describing the operations of individual switches included in the vehicle charging apparatus.
Figure 7:
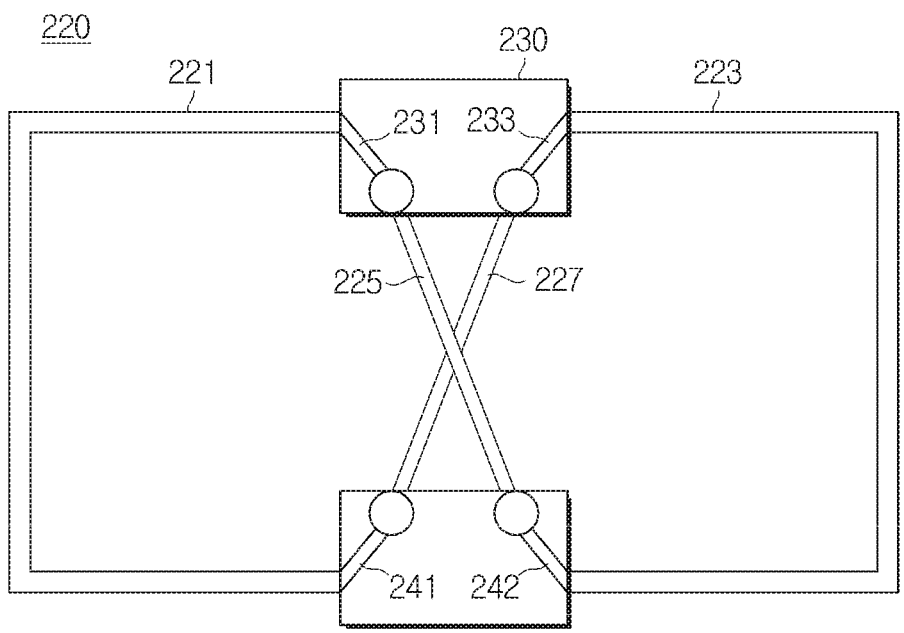
FIG. 7 is a second view describing the operations of the individual switches included in the vehicle charging apparatus.

The first switch 230 may connect the first coil 221 to the second coil 223, as shown in FIG. 4, or may connect the first coil 221 to the third coil 225 and the second coil 223 to the fourth coil 227, as shown in FIG. 7. In this case, the first switch 230 may connect one end of the first coil 221 to any one end of the second coil 223 and one end of the third coil 225, selectively, and connect one end of the second coil 223 to any one end of the first coil 221 and one end of the fourth coil 227, selectively.

The second switch 240 may be disposed at a location that is different from that of the first switch 230, and connect the first coil 221 to the second coil 223, as shown in FIG. 4, or connect the first coil 221 to the third coil 225 while connecting the second coil 223 to the fourth coil 227, as shown in FIG. 7. In other words, the second switch 240 may connect the other end of the first coil 221 to any one of the other end of the second coil 223 and the other end of the fourth coil 227, selectively, and connect the other end of the second coil 223 to any one of the other end of the first coil 221 and the other end of the third coil 225, selectively.

The first switch 230 and the second switch 240 may connect/disconnect the first to fourth coils 221 to 227 to/from each other, according to the control of the controller 283.

Figure 5:
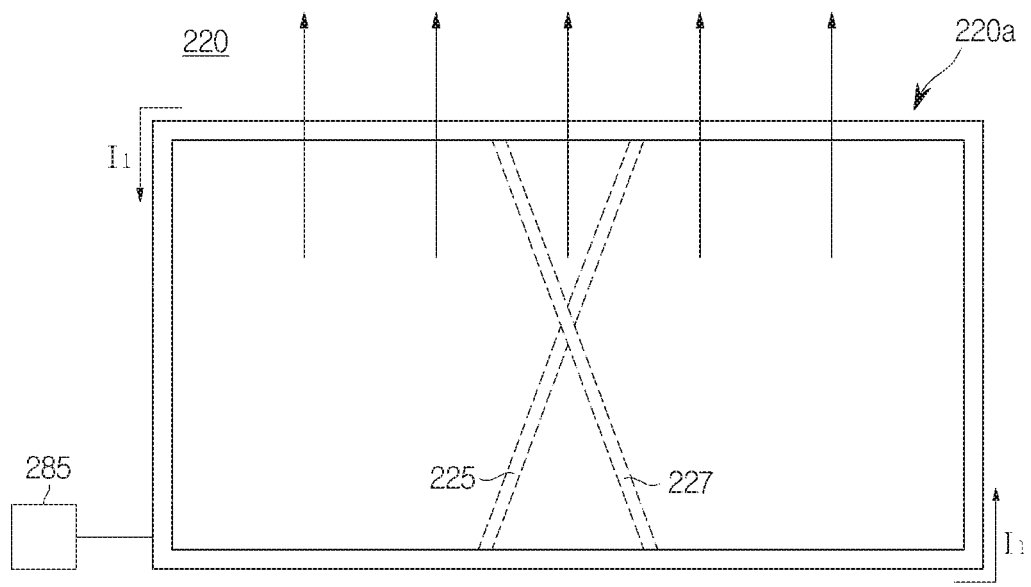
FIG. 5 shows an example of a magnetic field generated in the coil of the vehicle charging apparatus when the switches operate as shown in FIG. 4.
Figure 6:
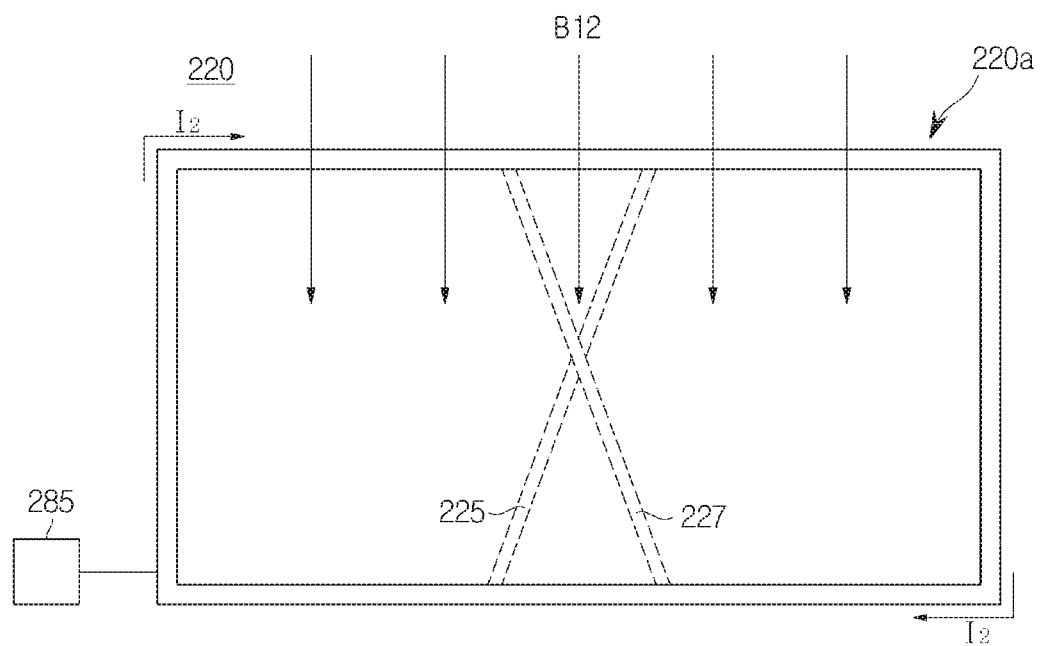
FIG. 6 shows another example of a magnetic field generated in the coil of the vehicle charging apparatus when the switches operate as shown in FIG. 4.

FIG. 4 is a first view for describing the operations of individual switches included in the vehicle charging apparatus, FIG. 5 shows an example of a magnetic field generated in the coil of the vehicle charging apparatus when the switches operate as shown in FIG. 4, and FIG. 6 shows another example of a magnetic field generated in the coil of the vehicle charging apparatus when the switches operate as shown in FIG. 4.

For example, as shown in FIG. 4, the first switch 230 may include a first switching element 231 electrically connected to one end of the first coil 221, and a second switching element 233 electrically connected to one end of the second coil 223. Also, the second switch 240 may include a third switching element 241 electrically connected to the other end of the first coil 221, and a fourth switching element 243 electrically connected to the other end of the second coil 223.

If a control signal related to the first structure of the coil 220 is input to the first switch 230 and the second switch 240 from the controller 283, the first switching element 231 and the second switching element 233 of the first switch 230 may be electrically connected to each other to electrically connect one end of the first coil 221 to one end of the second coil 223. Also, the third switching element 241 and the fourth switching element 243 of the second switch 240 may be electrically connected to each other to electrically connect the other end of the first coil 221 to the other end of the second coil 223.

In this case, the first coil 221 and the second coil 223 may be electrically disconnected from the third coil 225 and the fourth coil 227. Therefore, as shown in FIGS. 5 and 6, current I1 and I2 (also, referred to as first current I1 and second current I2) supplied from the power supply 285 may flow through the first coil 221 and the second coil 223, without flowing through the third coil 225 and the fourth coil 227.

Accordingly, the charging coil 220 may become a charging coil 220a of a circular structure, as shown in FIGS. 5 and 6.

The current I1 and I2 supplied from the power source 285 may be alternating current. Accordingly, the current I1 and I2 flowing in opposite directions may flow through the charging coil 220a of the circular structure, sequentially, while changing the magnitude. When the first current I1 flows, a magnetic field B11 of a first direction may be formed in correspondence to a change of the first current I1, in the charging coil 220a of the circular structure, as shown in FIG. 5. When the second current I2 flows, a magnetic field B12 of a second direction which is opposite to the first direction may be formed in correspondence to a change of the second current I2, in the charging coil 220a of the circular structure, as shown in FIG. 6.

Figure 8:
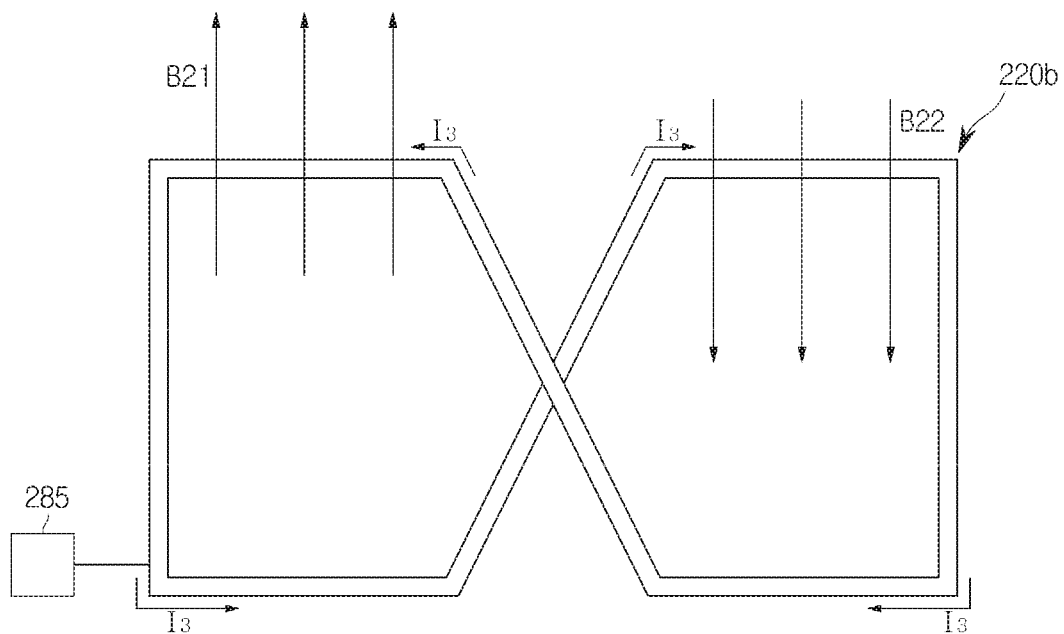
FIG. 8 shows an example of a magnetic field generated in the coil of the vehicle charging apparatus when the switches operate as shown in FIG. 7.
Figure 9:
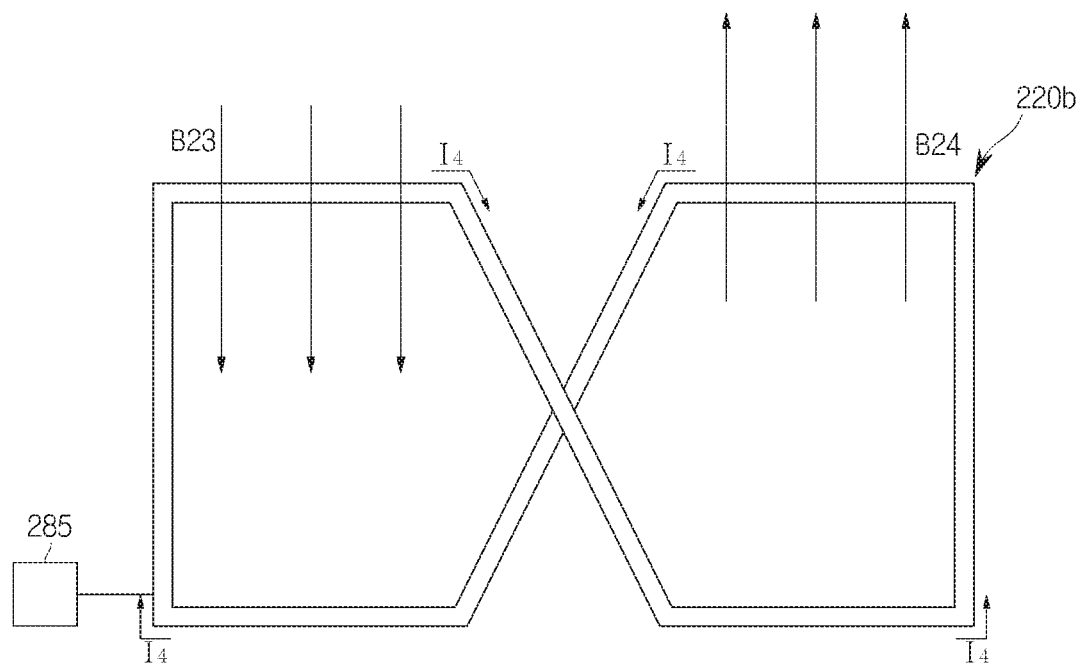
FIG. 9 shows another example of a magnetic field generated in the coil of the vehicle charging apparatus when the switches operate as shown in FIG. 7.

FIG. 7 is a second view describing the operations of the individual switches included in the vehicle charging apparatus, FIG. 8 shows an example of a magnetic field generated in the coil of the vehicle charging apparatus when the switches operate as shown in FIG. 7, and FIG. 9 shows another example of a magnetic field generated in the coil of the vehicle charging apparatus when the switches operate as shown in FIG. 7.

If a control signal related to the second structure of the coil 220 is input to the first switch 230 and the second switch 240 from the controller 283, the first switching element 231 of the first switch 230 may be electrically connected to the third coil 225 to thus electrically connect one end of the first coil 221 to one end of the third coil 225. Also, the second switching element 233 of the first switch 230 may be electrically connected to the fourth coil 227 to thus electrically connect one end of the second coil 223 to one end of the fourth coil 227.

Also, the third switching element 241 of the second switch 240 may be electrically connected to the fourth coil 227 to thus electrically connect the other end of the first coil 221 to the other end of the fourth coil 227, and the fourth switching element 242 of the second switch 24 may be electrically connected to the third coil 225 to thus electrically connect the other end of the second coil 223 to the other end of the third coil 225.

Accordingly, all of the first coil 221, the second coil 223, the third coil 225, and the fourth coil 227 may be electrically connected to each other, so that current applied from the power supply 285 may flow through all of the first coil 221, the second coil 223, the third coil 225, and the fourth coil 227.

In this case, the charging coil 220 may become a charging coil 220b of an "8"-shaped structure, as shown in FIGS. 8 and 9.

Current I3 and I4 (also, referred to as third current I3 and fourth current I4) applied from the power supply 285 may be alternating current. Accordingly, the current I3 and I4 flowing in opposite directions may flow through the charging coil 220b of the "8"-shaped structure, sequentially, while changing the magnitude. The charging coil 220b of the "8"-shaped structure may form magnetic fields B21 and B22, similarly to the case in which two circular coils are arranged side by side in a first region and a second region, respectively.

When the third current I3 flows, the magnetic field B21 may be formed in a first direction in the first region of the charging coil 220b of the "8"-shaped structure, and in the second region, the magnetic field B22 may be formed in a second direction that is opposite to the first direction. If the fourth current I4 flows in the opposite direction of the third current I3, in the first region of the charging coil 220b of the "8"-shaped structure, a magnetic field B23 may be formed in the second direction, unlike when the third current I3 flows, and in the second region, a magnetic field B24 may be formed in the first direction.

According to the operations of the first switch 230 and the second switch 240, the charging coil 220 may be implemented as the charging coil 220a of the first structure, or as the charging coil 220b of the second structure.

Accordingly, when the signal inducer 110 has a coil of a specific structure or shape, for example, a coil of a circular structure or a coil of an "8"-shaped structure, the shape of the coil structure 220 of the magnetic field generator 210 may change in correspondence to the structure of the signal inducer 110 so that appropriate induced current can flow through the signal inducer 110 according to a magnetic field generated by the magnetic field generator 210.

The forms of the present disclosure in which the first switch 230 includes the first switching element 231 and the second switching element 233, and the second switch 240 includes the third switching element 241 and the fourth switching element 242 has been described above. However, the structures of the first switch 230 and the second switch 240 are not limited to these. The first switch 230 and the second switch 240 can be implemented using a circuit structure to enable the individual coils 221 to 227 to connect to each other as described above. In this case, the first switch 230 and the second switch 240 may be circuit components such as transistors. Also, the first switch 230 and the second switch 240 may have the same structure, or different structures, according to the designer's arbitrary selection.

The structure and configuration of the magnetic field generator 210 as described above with reference to FIGS. 3 to 9 may be applied to the signal inducer 110, in the same manner or through appropriate modifications.

In other words, the signal inducer 110 may include a plurality of coils and a plurality of switches arranged as shown in FIG. 3, and the plurality of coils may be connected/disconnected to/from each other according to operations of the plurality of switches.

More specifically, the signal inducer 110 may include a first coil, a second coil having one end selectively connected to one end of the first coil, and the other end selectively connected to the other end of the first coil, a third coil having one end selectively connected to one end of the first coil, and the other end selectively connected to the other end of the second coil, a fourth coil having one end selectively connected to one end of the second coil, and the other end selectively connected to the other end of the first coil, a first switch configured to connect the first coil to any one of the second coil and the third coil, and to connect the second coil to any one of the first coil and the fourth coil, and a second switch configured to connect the first coil to any one of the second coil and the fourth coil, and to connect the second coil to any one of the first coil and the third coil.

As described above, the signal inducer 110 may change to a coil of a first structure or a coil of a second structure, depending on operations of the first switch and the second switch. Accordingly, when the magnetic field generator 210 is implemented with a coil of a fixed structure, for example, any one of the coil of the first structure and the coil of the second structure, the first switch and the second switch of the signal inducer 110 can be switched or maintained to make the coil structure of the signal inducer 110 identical to or corresponding to that of the magnetic field generator 210. Accordingly, the battery 130 of the vehicle 100 can be appropriately charged.

Hereinafter, the operation of the magnetic field generator 210 according to the structure of the signal inducer 110 of the vehicle 100 will be described in detail.

Figure 10:
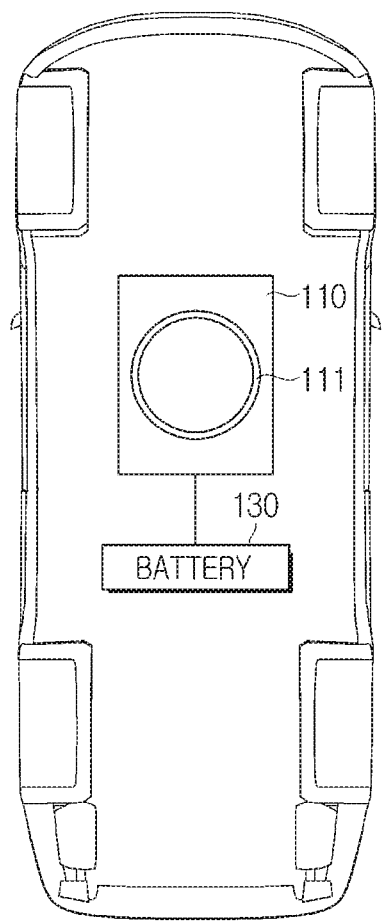
FIG. 10 shows a signal inducer installed in a vehicle.
Figure 11:
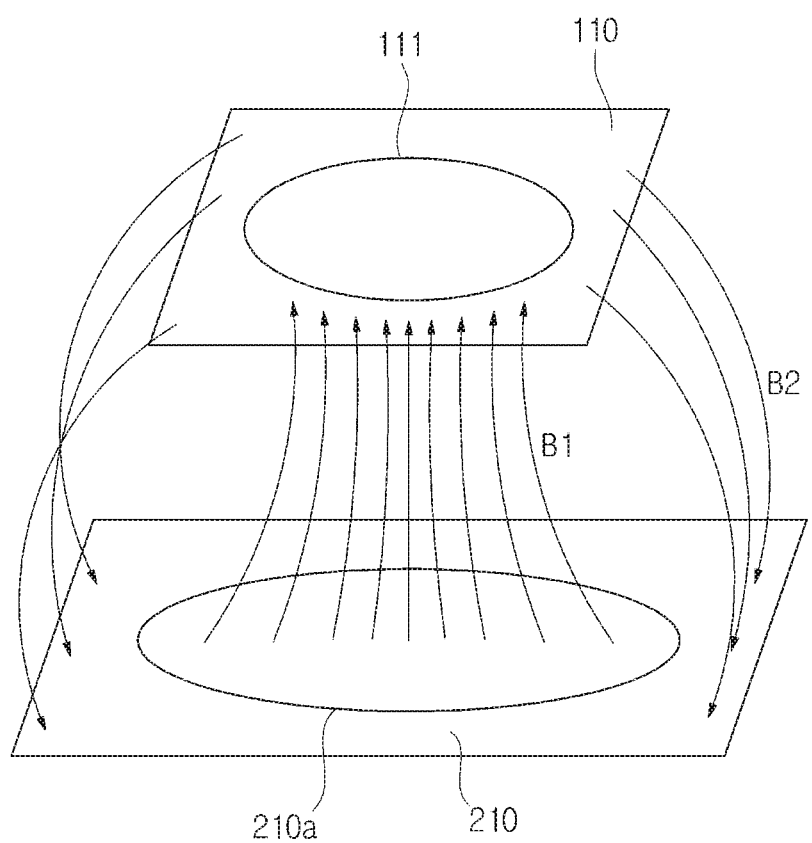
FIG. 11 shows an example of magnetic fields formed between the vehicle charging apparatus and the signal inducer installed in the vehicle as shown in FIG. 10.

FIG. 10 shows a signal inducer installed in a vehicle, and FIG. 11 shows an example of magnetic fields formed between the vehicle charging apparatus and the signal inducer installed in the vehicle as shown in FIG. 10.

As shown in FIG. 10, the signal inducer 110 may be installed in the lower portion of the vehicle 100. If the vehicle 100 is a normal vehicle such as sedan, a single signal inducer 110 may be installed in the lower portion of the vehicle 100. If the vehicle 100 is a large vehicle such as a truck or a bus, a plurality of signal inducers 110 may be installed in the lower portion of the vehicle 100.

If the signal inducer 110 installed in the lower portion of the vehicle 100 is a coil 111 of a circular structure, the first switch 230 and the second switch 240 may connect both ends of the first coil 221 to the corresponding ends of the second coil 223 according to a control signal to change the coil of the magnetic field generator 210 to the first structure, that is, the coil 220a of the circular structure, as shown in FIG. 5.

In this case, whether the signal inducer 110 is the coil 111 of the circular structure may be determined based on information input by a user through the user interface, or with reference to a standard or regional information. Also, whether the signal inducer 110 is the coil 111 of the circular structure may be determined based on the magnitude of induced current and/or an induced electromotive force of the signal inducer 110. The determination on whether the signal inducer 110 is the coil 111 of the circular structure may be performed by at least one of the vehicle controller 150 and the controller 283 of the charging manager 280.

If the magnetic field generator 210 changes to the coil 220a of the circular structure, the coil structure of the magnetic field generator 210 may become identical to the coil structure of the signal inducer 110.

If current is applied, magnetic fields B1 and B2 may be respectively formed in the inside and outside of the coil 220a of the circular structure of the magnetic field generator 210. The magnetic fields B1 and B2 may be formed toward opposite directions in the inside and outside of the coil 220a. The magnetic fields B1 and B2 may be formed substantially toward the coil 111 of the circular structure, or substantially toward the opposite direction of the coil 111 of the circular structure, according to the application direction of current.

As the magnetic fields B1 and B2 are formed, induced current may flow through the coil 111 of the circular structure of the signal inducer 110. As described above, since the coil structure of the magnetic field generator 210 is identical to the coil structure of the signal inducer 110, induced current and an induced voltage of relatively appropriate magnitudes corresponding to the formed magnetic fields B1 and B2 may be induced in the coil 111 of the circular structure of the signal inducer 110.

Accordingly, the battery 130 electrically connected to the signal inducer 110 can be charged more quickly and stably.

Figure 12:
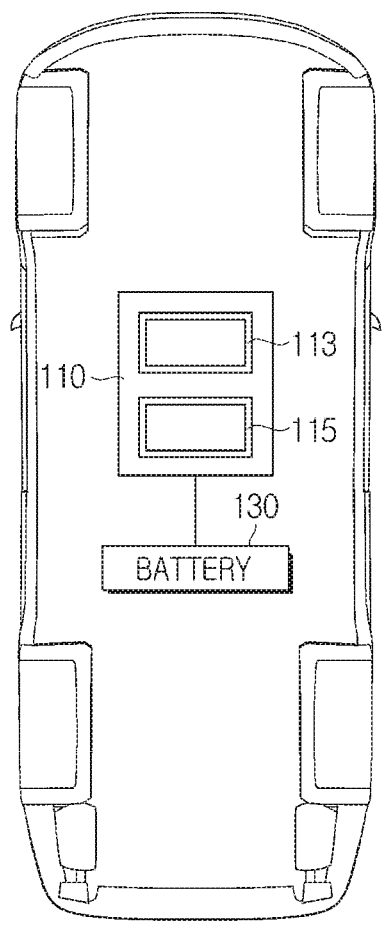
FIG. 12 shows another signal inducer installed in the vehicle.
Figure 13:
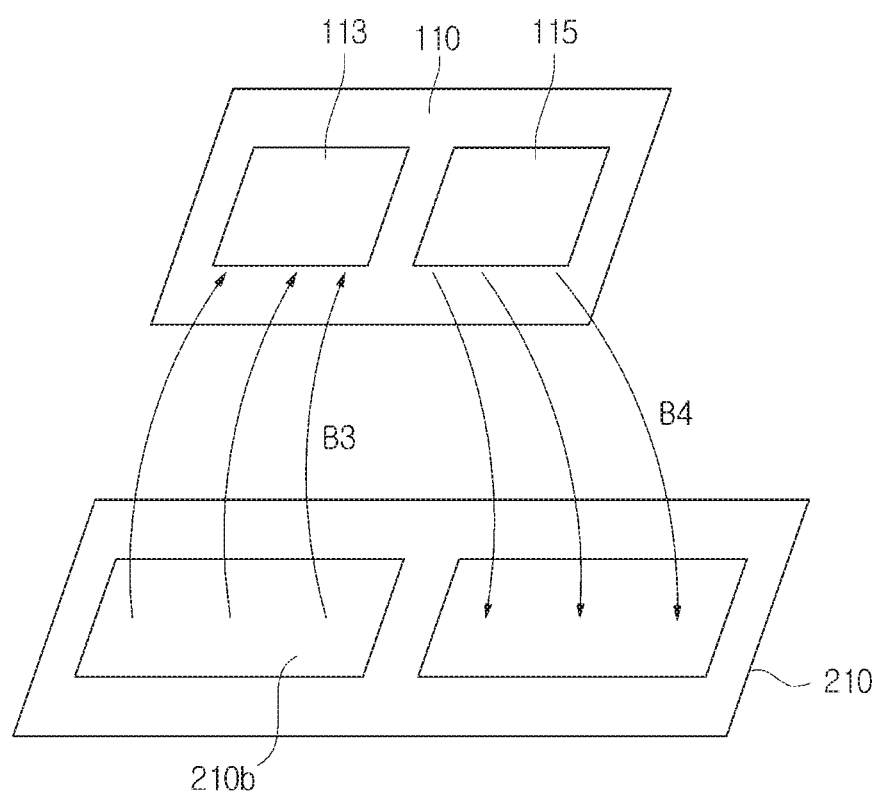
FIG. 13 shows an example of magnetic fields formed between the vehicle charging apparatus and the signal inducer installed in the vehicle as shown in FIG. 12.

FIG. 12 shows another signal inducer installed in the vehicle, and FIG. 13 shows an example of magnetic fields formed between the vehicle charging apparatus and the signal inducer installed in the vehicle as shown in FIG. 12.

As shown in FIG. 12, at least one signal inducer 110 including a coil of an "8"-shaped structure may be installed in the lower portion of the vehicle 100. The coil of the "8"-shaped structure may be implemented by arranging two circular coils 113 and 115 side by side. According to the size of the vehicle 100, a plurality of signal inducers 110 may be installed in the lower portion of the vehicle 100.

As such, if the signal inducer 110 installed in the lower portion of the vehicle 100 has the coil 111 of the "8"-shaped structure, the first switch 230 may connect one end of the first coil 221 to one end of the third coil 225, and connect one end of the second coil 223 to one end of the fourth coil 227, according to a control signal. The second switch 240 may connect the other end of the first coil 221 to the other end of the fourth coil 227, and connect the other end of the second coil 223 to the other end of the third coil 225. Accordingly, the coil of the magnetic field generator 210 may change to the coil of the second structure, that is, the coil 220b of the "8"-shaped structure as shown in FIGS. 8 and 9.

If the magnetic field generator 210 changes to the coil 220b of the "8"-shaped structure, the coil structure of the magnetic field generator 210 may become identical to the coil structure of the signal inducer 110, as shown in FIG. 13.

If current is applied to the magnetic field generator 210, magnetic fields B3 and B4 may be respectively formed in opposite directions in the first region and the second region of the magnetic field generator 210, and according to the magnetic fields B3 and B4 formed in the opposite directions, induced current may flow through the respective circular coils 113 and 115 of the signal inducer 110. As described above, since the coil structure of the magnetic field generator 210 is identical to the coil structure of the signal inducer 110, induced current and an induced voltage of relatively appropriate magnitudes may be induced in the respective circular coils 113 and 115 of the signal inducer 110, so that the battery 130 can be charged quickly and stably.

The example in which the magnetic field generator 210 changes according to the structure of the signal inducer 110 of the vehicle 100 has been described above with reference to FIGS. 10 to 13. However, this can be applied to the case in which the signal inducer 110 changes according to the structure of the magnetic field generator 210, in the same manner or through appropriate modifications.

Hereinafter, various forms of a vehicle charging method will be described with reference to FIGS. 14 and 15.

Hereinafter, various forms of a vehicle charging method in the case in which the coil structure of the signal inducer 110 is fixed, and the coil structure of the magnetic field generator 210 is variable will be described. However, the vehicle charging method is not limited to the forms which will be described below. The vehicle charging method which will be described below may be applied to the case in which the coil structure of the signal inducer 110 is variable, and the coil structure of the magnetic field generator 210 is fixed, in the same manner or through appropriate modifications.

Figure 14:
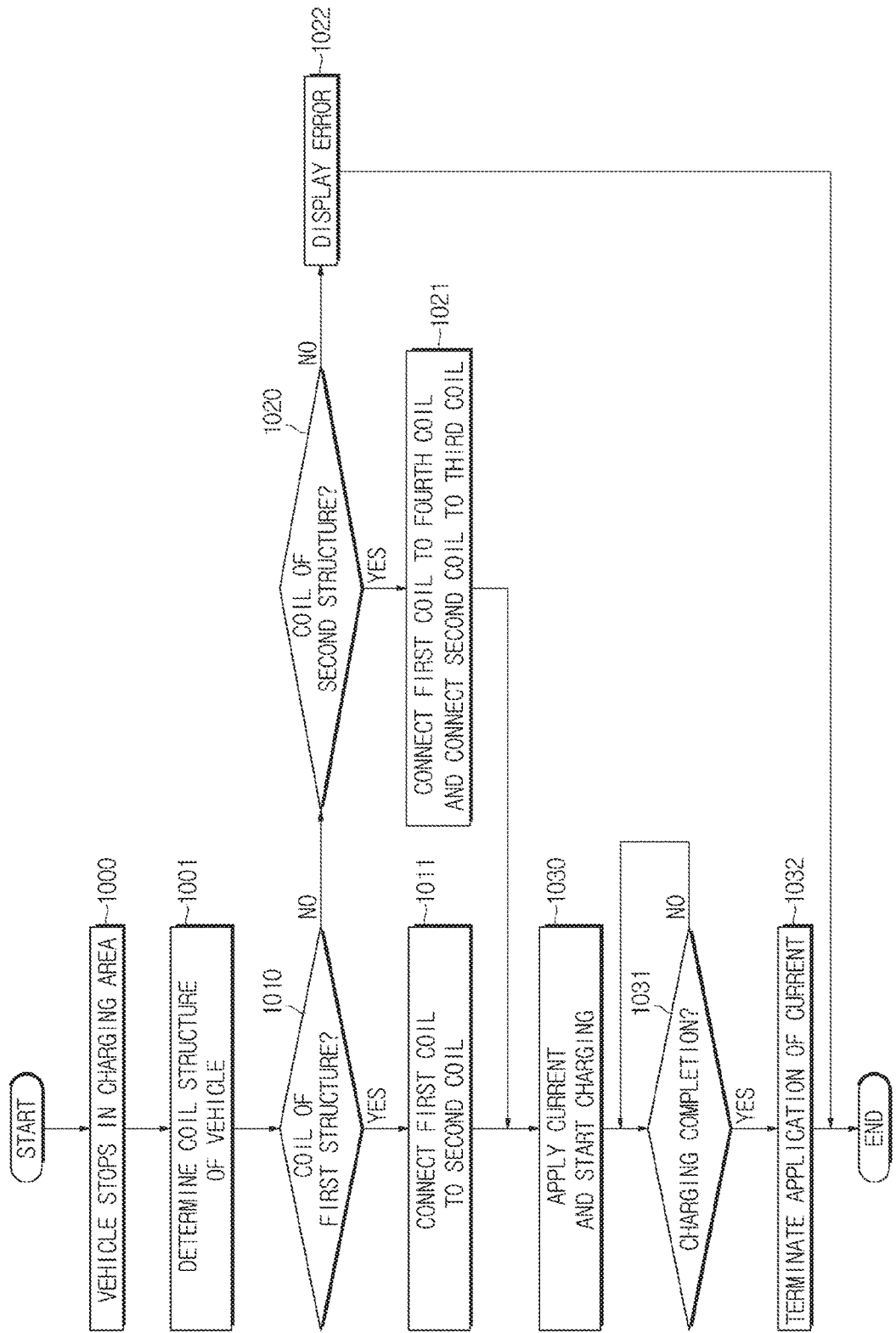
FIG. 14 is a flowchart illustrating a vehicle charging method.

FIG. 14 is a flowchart illustrating a vehicle charging method.

In some forms of the vehicle charging method shown in FIG. 14, first, the vehicle including the signal inducer may move to a charging area, and then stop or be parked in the charging area, in operation 1000. In this case, the signal inducer of the vehicle may be located close to the magnetic field generator of the vehicle charging apparatus in such a way to face the magnetic field generator. Meanwhile, the coil of the magnetic field generator of the vehicle charging apparatus may have been set in advance to a first structure (for example, a circular structure) or a second structure (for example, an "8"-shaped structure).

If the vehicle stops or is parked in the charging area, the coil structure of the signal inducer of the vehicle may be determined according to a user's manipulation or a pre-defined setting, in operation 1001. The determination on the coil structure of the vehicle may be performed based on information about the coil structure of the vehicle, input by the user, or based on a pre-defined setting such as a pre-defined standard or regional information. The determination on the coil structure of the vehicle may be performed by at least one of the vehicle and the vehicle charging apparatus.

If the coil structure of the signal inducer of the vehicle is the first structure ("Yes" in operation 1010), the first switch and the second switch of the magnetic field generator may connect the first coil and the second coil respectively connected to the first switch and the second switch to each other to change the coil to the first structure, that is, the circular structure, in operation 1011. If the coil structure of the magnetic field generator has been set in advance to the first structure, the first switch and the second switch may perform no operation so that the coil structure of the magnetic field generator is maintained as the first structure.

If the coil structure of the signal inducer is the second structure ("No" in operation 1010 and "Yes" in operation 1020), the first switch may operate to connect one end of the first coil to one end of the third coil, and to connect one end of the second coil to one end of the fourth coil, and also, the second switch may operate to connect the other end of the first coil to the other end of the fourth coil, and to connect the other end of the second coil to the other end of the third coil, in operation 1021.

Accordingly, the coil structure of the magnetic field generator may be set to the second structure, that is, the "8"-shaped structure.

If the coil structure of the magnetic field generator is identical to or corresponds to the coil structure of the signal inducer of the vehicle, in other words, if both the coil structures of the magnetic field generator and the signal inducer of the vehicle are the first structure or the second structure, current may be applied to the magnetic field generator, and induced current according to an induced electromotive force may flow through the signal inducer to start charging the battery of the vehicle, in operation 1030.

The charging of the battery may terminate when the battery is completely charged in operation 1031, when a user inputs a command for stopping charging the battery through the user interface provided in the vehicle charging apparatus, or when the vehicle escapes from the charging area.

If the charging of the battery terminates ("Yes" in operation 1031), current may be no longer applied to the magnetic field generator, in operation 1032.

Meanwhile, in some forms of the present disclosure, if the coil structure of the vehicle does not correspond to any one of the first structure and the second structure ("No" in operation 1020), the user interface of the vehicle charging apparatus may display an error signal visibly or audibly, in operation 1022.

Figure 15:
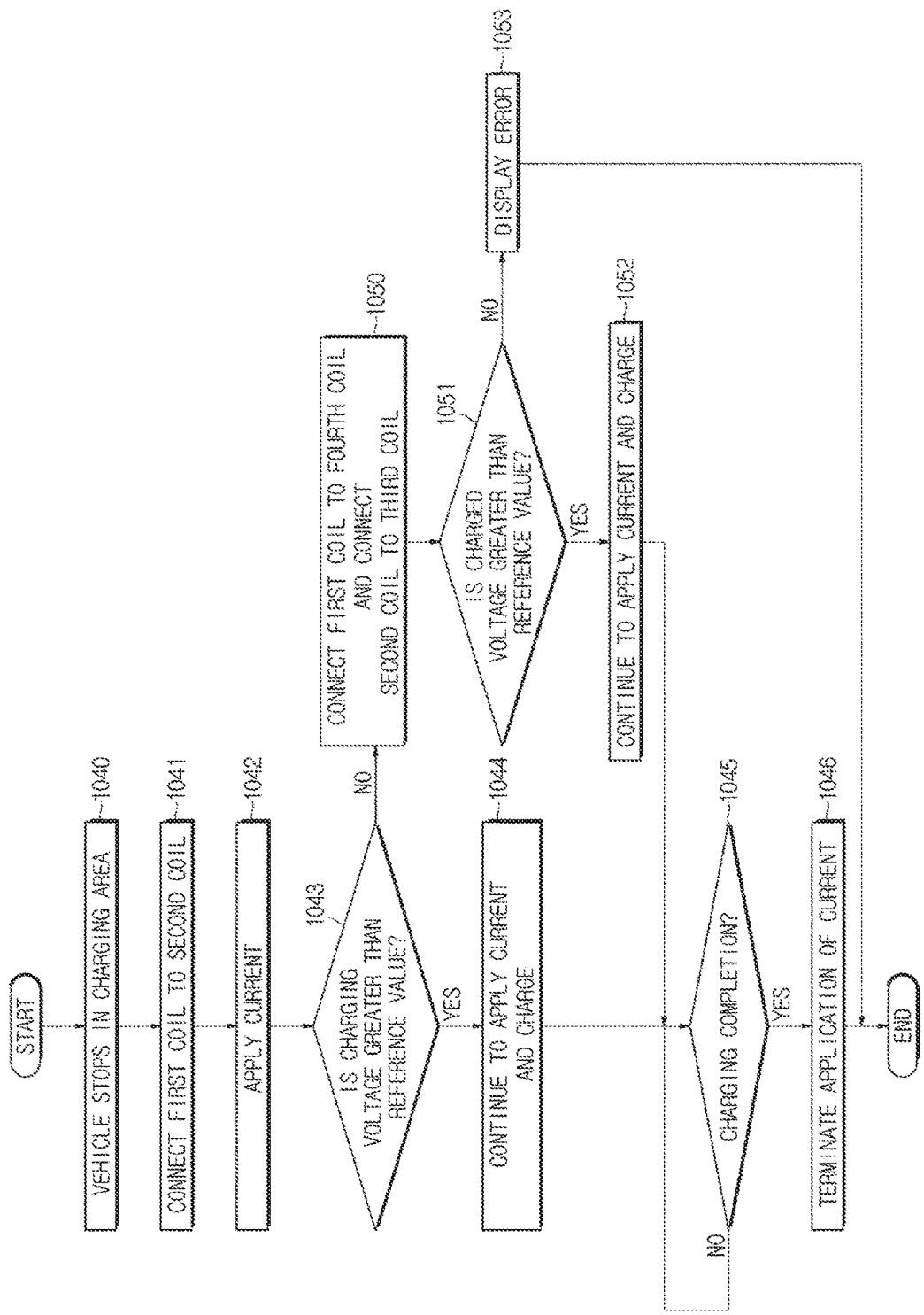
FIG. 15 is a flowchart illustrating another vehicle charging method.

FIG. 15 is a flowchart illustrating another vehicle charging method.

In another form of the vehicle charging method as shown in FIG. 15, the vehicle including the signal inducer may move to a charging area, and then stop or be parked in the charging area, in operation 1040. In this case, the signal inducer of the vehicle may be located close to the magnetic field generator of the vehicle charging apparatus.

If the vehicle stops or is parked in the charging area, the first switch and the second switch provided in the charging coil of the magnetic field generator may connect the first coil and the second coil respectively connected to the first switch and the second switch to each other so that the charging coil has the first structure, that is, the circular structure, in operation 1041. In some forms of the present disclosure, the first switch may connect one end of the first coil to one end of the third coil, and connect one end of the second coil to one end of the fourth coil, and the second switch may connect the other end of the first coil to the outer end of the fourth coil, and connect the other end of the second coil to the other end of the third coil so that the charging coil has the second structure, that is, the "8"-shaped structure.

If the charging coil of the magnetic field generator provided in the vehicle charging apparatus is set to the first structure or the second structure, current may be applied to the charging coil, in operation 1042.

After current is applied to the charging coil, at least one of the induced current and induced electromotive force of the signal inducer and the charged voltage of the battery may be measured, in operation 1043.

If the measured one of the induced current and induced electromotive force of the signal inducer and the charged voltage of the battery is greater than a pre-defined reference value ("Yes" in operation 1043), it is determined that charging is appropriately performed. In other words, it is determined that the structure of the charging coil of the magnetic field generator is identical to or corresponds to the structure of the coil of the signal inducer. The determination may be performed by at least one of the vehicle and the vehicle charging apparatus. Accordingly, no control signal for the first switch and the second switch may be generated, and the current may continue to be applied to the charging coil, in operation 1044.

If the measured one of the induced current and induced electromotive force of the signal inducer and the charged voltage of the battery is smaller than the pre-defined reference value ("No" in operation 1043), the structure of the charging coil of the magnetic field generator may change, in operation 1050.

For example, if the charging coil of the magnetic field generator has been set in advance to the first structure, the first switch and the second switch may operate to change the charging coil of the magnetic field generator to the second structure. In this case, according to the control of the controller provided in the vehicle or the vehicle charging apparatus, the first switch may connect one end of the first coil to one end of the third coil, and connect one end of the second coil to one end of the fourth coil, and the second switch may connect the other end of the first coil to the other end of the fourth coil, and connect the other end of the second coil to the other end of the third coil to thereby change the charging coil to the second structure.

If the charging coil of the magnetic field generator has been set in advance to the second structure, the first switch and the second switch may operate to change the charging coil of the magnetic field generator to the first structure.

In this case, according to the control of the controller provided in the vehicle or the vehicle charging apparatus, the first switch may connect one end of the first coil to one end of the second coil, and connect the other end of the first coil to the other end of the second coil to thereby change the charging coil to the first structure.

If the structure of the charging coil of the magnetic field generator changes, at least one of the induced current and the induced electromotive force of the signal inducer and the charged voltage of the battery may be again compared to the pre-defined reference value, in operation 1051.

If the measured one of the induced current and induced electromotive force of the signal inducer and the charged voltage of the battery is greater than the pre-defined reference value ("Yes" in operation 1051), current may be applied to the magnetic field generator to start charging the battery, in operation 1052.

In some forms of the present disclosure, if the measured one of the induced current and induced electromotive force of the signal inducer and the charged voltage of the battery is smaller than the pre-defined reference value ("No" in operation 1051) although the structure of the charging coil of the magnetic field generator changes, the user interface of the vehicle charging apparatus may output an error signal visibly or audibly to inform the user of the generation of an error, in operation 1053.

As described above, the charging of the battery may terminate when a predetermined situation occurs, such as when the battery is completely charged in operation 1045, when a user inputs a command for stopping charging the battery to the vehicle charging apparatus, or when the vehicle escapes from the charging area.

If the charging of the battery terminates ("Yes" in operation 1045), current may be no longer applied to the magnetic field generator, in operation 1046.

Depending on the vehicle, the vehicle charging apparatus, the vehicle charging system, and the vehicle charging method, as described above, the vehicle can be wirelessly charged appropriately regardless of the structure of the coil in which signals are induced by a magnetic field.

Also, depending on the vehicle, the vehicle charging apparatus, the vehicle charging system, and the vehicle charging method, as described above, since the coil structure of at least one of the vehicle and the vehicle charging apparatus can change to various structures, it is possible to charge vehicles having different coil structures using the same vehicle charging apparatus, or to charge the same vehicle using vehicle charging apparatuses having different structures.

Additionally, depending on the vehicle, the vehicle charging apparatus, the vehicle charging system, and the vehicle charging method, as described above, it is unnecessary to install a plurality of different charging apparatuses in correspondence to the coil structures of vehicles, resulting in a reduction of installation costs for charging infrastructure.

Moreover, depending on the vehicle, the vehicle charging apparatus, the vehicle charging system, and the vehicle charging method, as described above, by appropriately changing the coil structure of the vehicle regardless of the coil structure of the vehicle charging apparatus, it is possible to charge the battery of the vehicle, or to more quickly charge the battery of the vehicle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle charging apparatus comprising:
    a first coil;
    a second coil, wherein one end of the second coil is selectively connected to one end of the first coil, and the other end of the second coil is selectively connected to the other end of the first coil;
    a third coil, wherein one end of the third coil is selectively connected to one end of the first coil, and the other end of the third coil is selectively connected to the other end of the second coil; and
    a fourth coil, wherein one end of the fourth coil is selectively connected to one end of the second coil, and the other end of the fourth coil is selectively connected to the other end of the first coil, wherein the fourth coil configured to intersect the third coil.

2. The vehicle charging apparatus according to claim 1, further comprising:
    a first switch configured to electrically connect one end of the first coil to one end of the second coil, or to electrically connect one end of the first coil to one end of the third coil.

3. The vehicle charging apparatus according to claim 2, wherein, when one end of the first coil is electrically connected to one end of the third coil, the first switch electrically connects one end of the second coil to one end of the fourth coil.

4. The vehicle charging apparatus according to claim 2, further comprising:
    a second switch configured to electrically connect the other end of the first coil to the other end of the second coil, or to electrically connect the other end of the first coil to the other end of the fourth coil.

5. The vehicle charging apparatus according to claim 4, wherein, when the other end of the first coil is electrically connected to the other end of the fourth coil, the second switch is configured to electrically connect the other end of the second coil to the other end of the third coil.

6. The vehicle charging apparatus according to claim 4, further comprising:
    a controller configured to transfer a control signal to the first switch and the second switch.

7. The vehicle charging apparatus according to claim 6, wherein the controller is configured to control operations of the first switch and the second switch based on a user's manipulation or a pre-defined setting.

8. The vehicle charging apparatus according to claim 7, wherein a coil structure of a signal inducer installed in the vehicle is determined by the pre-defined setting, wherein the coil structure of the signal inducer is charged based on current flowing through the first coil, the second coil, the third coil, or the fourth coil.

9. The vehicle charging apparatus according to claim 6, wherein the controller is configured to:

control the first switch, wherein the first switch electrically connects one end of the first coil to one end of the second coil; and control the second switch, wherein the second switch electrically connects the other end of the first coil to the other end of the second coil.

10. The vehicle charging apparatus according to claim 9, further comprising a communication module configured to communicate with a vehicle.

11. The vehicle charging apparatus according to claim 10, wherein the communication module is configured to receive information regarding a voltage of an electrical signal induced by the signal inducer of the vehicle, and the controller is configured to decide operations of the first switch and the second switch based on the information regarding the voltage of the electrical signal induced by the signal inducer of the vehicle.

12. The vehicle charging apparatus according to claim 11, wherein, when the voltage of the electrical signal is greater than a reference value, the controller is configured to decide that the operations of the first switch and the second switch need to be maintained.

13. The vehicle charging apparatus according to claim 12, wherein, when the voltage of the electrical signal is less than or equal to the reference value, the controller is configured to:
control the first switch, wherein the first switch electrically connects one end of the first coil to one end of the third coil, and electrically connects one end of the second coil to one end of the fourth coil; and
control the second switch, wherein the second switch electrically connects the other end of the first coil to the other end of the fourth coil, and electrically connects the other end of the second coil to the other end of the third coil.

14. A vehicle charging system comprising:
a vehicle charging apparatus configured to generate a magnetic field corresponding to an applied electrical signal; and
a signal inducer included in a vehicle configured to induce current based on the magnetic field,
wherein the vehicle charging apparatus comprises:
a first coil;
a second coil, wherein one end of the second coil selectively connected to one end of the first coil, and the other end of the second coil selectively connected to the other end of the first coil;
a third coil, wherein one end of the third coil selectively connected to one end of the first coil, and the other end of the third coil selectively connected to the other end of the second coil; and
a fourth coil, wherein one end of the fourth coil selectively connected to one end of the second coil, and the other end of the fourth coil selectively connected to the other end of the first coil.

15. The vehicle charging system according to claim 14, wherein the vehicle charging apparatus is configured to communicate with the vehicle, and the vehicle is configured to transfer information of a plurality of the information to the vehicle charging apparatus, wherein the information comprises a structure of the signal inducer and a voltage of an electrical signal induced by the signal inducer.

16. The vehicle charging system according to claim 15, wherein one end of the first coil is connected to one end of the second coil, or to one end of the third coil, depending on the structure of the signal inducer.

17. The vehicle charging system according to claim 14, wherein the signal inducer comprises a coil of a circular structure or an "8"-shaped structure.

18. A vehicle comprising:
a first coil installed in one location of a plurality of the locations of the vehicle;
a second coil, wherein one end of the second coil is selectively connected to one end of the first coil, and the other end of the second coil is selectively connected to the other end of the first coil;
a third coil, wherein one end of the third coil is selectively connected to one end of the first coil, and the other end of the third coil is selectively connected to the other end of the second coil; and
a fourth coil, wherein one end of the fourth coil is selectively connected to one end of the second coil, and the other end of the fourth coil is selectively connected to the other end of the first coil.

19. A vehicle comprising:
a signal inducer, wherein induced current flows through the signal inducer by a magnetic field generated by a charging coil of a vehicle charging apparatus;
a measuring device configured to measure a magnitude of the induced current or an induced electromotive force of the signal inducer;
a controller configured to compare the magnitude of the induced current or the induced electromotive force with a pre-defined value, and to generate a coil-structure changing command, when the magnitude of the induced current or the induced electromotive force is less than the pre-defined value; and
a communication module configured to transmit the coil-structure changing command to the vehicle charging apparatus.

20. A vehicle charging method comprising:
determining a structure of a signal inducer of a vehicle;
when the structure of the signal inducer is a first structure, connecting both ends of a first coil provided in a vehicle charging apparatus to both ends of a second coil; and
when the structure of the signal inducer is a second structure, connecting one end of the first coil to one end of a third coil, connecting the other end of the first coil to the other end of a fourth coil, connecting one end of the second coil to one end of the fourth coil, and connecting the other end of the second coil to the other end of the third coil, wherein the third coil intersects the fourth coil.

21. The vehicle charging method according to claim 20, wherein determining the structure of the signal inducer of the vehicle comprises at least receiving information regarding the structure of the signal inducer of the vehicle from a user, and determining the structure of the signal inducer of the vehicle based on the information, or determining the structure of the signal inducer of the vehicle based on a pre-defined setting.

22. A vehicle charging method comprising:
operating, with a first switch and a second switch of a magnetic field generator of a vehicle charging apparatus, to set the magnetic field generator to a first structure or a second structure;
receiving information regarding a voltage of a signal inducer from the vehicle;
when the voltage of the signal inducer is greater than a reference value, maintaining, with the magnetic field generator, the first structure or the second structure; and
when the voltage of the signal inducer is less than or equal to the reference value, operating, with the first switch and the second switch, to change the structure of the magnetic field generator from the first structure to the second structure, or to change the structure of the magnetic field generator from the second structure to the first structure.

23. The vehicle charging method according to claim 22, wherein:
- when the first switch and the second switch provided in the vehicle charging apparatus connect both ends of the first coil to both ends of the second coil, the first structure is set; and
- when the first switch and the second switch connect one end of the first coil to one end of the third coil, connect the other end of the first coil to the other end of the fourth coil, connect one end of the second coil to one end of the fourth coil, and connect the other end of the second coil to the other end of the third coil, the second structure is set.

\* \* \* \* \*